United States Patent
Seo et al.

(10) Patent No.: US 10,866,776 B2
(45) Date of Patent: Dec. 15, 2020

(54) PULL PRINTING METHOD AND SYSTEM USING CLOUD SERVER

(71) Applicant: Hewlett-Packard Development Company, L.P., Spring, TX (US)

(72) Inventors: Gi Won Seo, Seongnam-si (KR); In Cheon Park, Seongnam-si (KR); Wu Seok Jang, Seongnam-si (KR); Byeong Jin Lee, Seongnam-si (KR); Yeon Jung Lim, Seongnam-si (KR); Jeong Ho Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/618,981

(22) PCT Filed: Jun. 20, 2018

(86) PCT No.: PCT/KR2018/006940
§ 371 (c)(1),
(2) Date: Dec. 3, 2019

(87) PCT Pub. No.: WO2018/236136
PCT Pub. Date: Dec. 27, 2018

(65) Prior Publication Data
US 2020/0142656 A1    May 7, 2020

(30) Foreign Application Priority Data
Jun. 21, 2017 (KR) .................. 10-2017-0078598

(51) Int. Cl.
*G06F 3/12* (2006.01)

(52) U.S. Cl.
CPC ............ *G06F 3/1292* (2013.01); *G06F 3/129* (2013.01); *G06F 3/1222* (2013.01); *G06F 3/1238* (2013.01); *G06F 3/1287* (2013.01)

(58) Field of Classification Search
None
See application file for complete search history.

(56) References Cited

U.S. PATENT DOCUMENTS

| 8,189,225 B1 | 5/2012 | Lo et al. |
| 2013/0111045 A1 | 5/2013 | Ichikawa |

(Continued)

FOREIGN PATENT DOCUMENTS

WO    WO-2011115987 A2    9/2011

*Primary Examiner* — Henok Shiferaw
(74) *Attorney, Agent, or Firm* — Jefferson IP Law, LLP (57) ABSTRACT

A pull printing method and system using a cloud server when a user terminal may not use an internal wireless network are provided. A pull printing system may include a user terminal, a cloud server, and at least one print server to manage at least one image forming apparatus. In an example, the cloud server receives a registration request to register device information of the at least one image forming apparatus from the at least one print server, receives a login request comprising user information and device information of an image forming apparatus, from the user terminal, transmits the login request to a print server corresponding to the device information of the image forming apparatus, receives a job list as an authentication result according to the request, from the print server corresponding to the device information of the image forming apparatus, and transmits the job list to the user terminal.

18 Claims, 10 Drawing Sheets

(56) References Cited

U.S. PATENT DOCUMENTS

| | | | |
|---|---|---|---|
| 2013/0114107 A1* | 5/2013 | Park | G06F 3/1204 358/1.15 |
| 2015/0049359 A1* | 2/2015 | Lee | G06F 3/122 358/1.15 |
| 2015/0160899 A1 | 6/2015 | Lee et al. | |
| 2015/0178026 A1* | 6/2015 | Sato | G06F 3/1238 358/1.14 |
| 2016/0112585 A1* | 4/2016 | Park | G06F 3/1222 358/1.15 |
| 2017/0013169 A1* | 1/2017 | Kim | H04N 1/4413 |
| 2017/0094120 A1 | 3/2017 | Towata | |
| 2017/0134615 A1* | 5/2017 | Onose | H04N 1/00212 |
| 2017/0178225 A1* | 6/2017 | Suzuki | H04N 1/00344 |

* cited by examiner

PULL PRINTING METHOD AND SYSTEM USING CLOUD SERVER

BACKGROUND ART

The present disclosure relates to pull printing methods and systems using cloud servers. More specifically, the present disclosure relates to pull printing methods and systems using cloud servers when user terminals may not use internal wireless networks for connection to print servers.

Pull printing refers to a method by which an image forming apparatus communicates with a print server in which a print job is stored, receives the print job from the print server, and executes the received print job.

DISCLOSURE OF INVENTION

Brief Description of Drawings

The above and other aspects, features, and advantages of certain examples of the present disclosure will be more apparent from the following description taken in conjunction with the accompanying drawings, in which.

MODE FOR THE INVENTION

Hereinafter, examples of the present disclosure will be described more fully with reference to the accompanying drawings. The present disclosure may, however, be embodied in many different forms and should not be construed as being limited to the examples set forth herein. The following description and the attached drawings are provided for a better understanding of the present disclosure, and descriptions of techniques or structures related to the present disclosure, which would be obvious to one of ordinary skill in the art, will be omitted.

It will be understood that when an element is referred to as being "connected to" another element, it may be "directly connected to" the other element or "connected to the other element with intervening elements therebetween." Also, it will be further understood that when a part "includes" or "comprises" an element, unless otherwise defined, the part may further include other elements, not excluding the other elements.

It will be understood that, although the terms "first," "second," etc. may be used herein to describe various elements, these elements should not be limited by these terms. These terms are only used to distinguish one element from another.

The term "image forming job" as used herein may refer to any one of various jobs (e.g., printing, copying, scanning, or faxing) related to an image, such as forming an image or generating/storing/transmitting an image file, and the term "job" may refer to not only an image forming job but may also refer to a series of processes required to perform the image forming job.

Also, the term "image forming apparatus" may refer to any apparatus capable of performing an image forming job, such as a printer, a copier, a scanner, a fax machine, a multi-function printer (MFP), a display apparatus, and the like.

Also, the term "hard copy" may refer to an operation of outputting an image to a print medium such as paper, and the term "soft copy" may refer to an operation of outputting an image to a display apparatus such as a TV, a monitor, and the like.

Also, the term "content" may refer to any type of data that is a target of an image forming job, such as a picture, an image, a document file, and the like.

Also, the term "print data" may refer to data having a format printable by a printer.

Also, the term "scan file" may refer to a file generated by scanning an image by using a scanner.

Also, the term "user" may refer to a person who performs an operation associated with an image forming job by using an image forming apparatus or by using a device connected by wire or wirelessly to the image forming apparatus. The term "manager" may refer to a person who has a right to access all functions of the image forming apparatus and a system. The "manager" and the "user" may refer to the same person.

The present examples relate to pull printing methods and systems using cloud servers, and descriptions of techniques or structures related to the present disclosure which would be obvious to one of ordinary skill in the art will be omitted.

Figure 1:
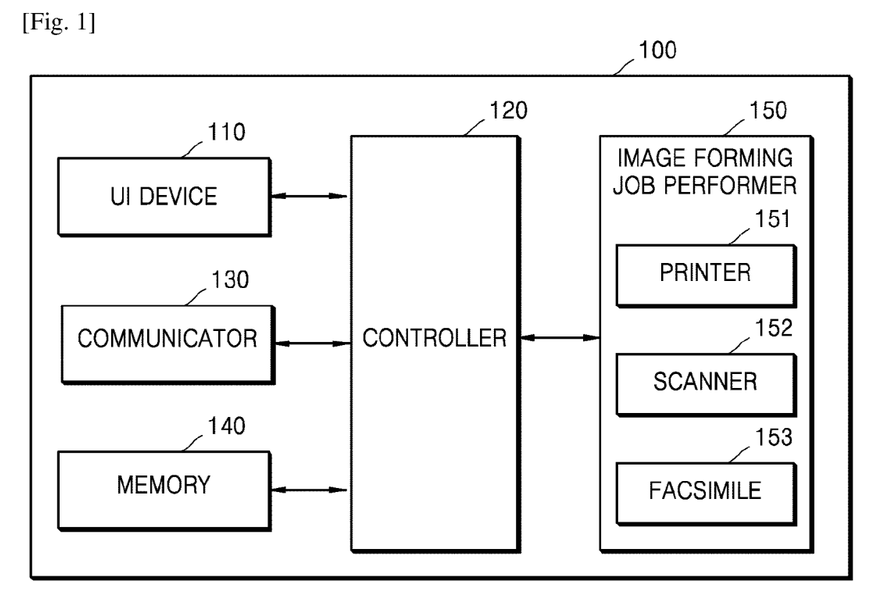
FIG. 1 is a block diagram illustrating a configuration of an image forming apparatus according to an example.
Figure 2:
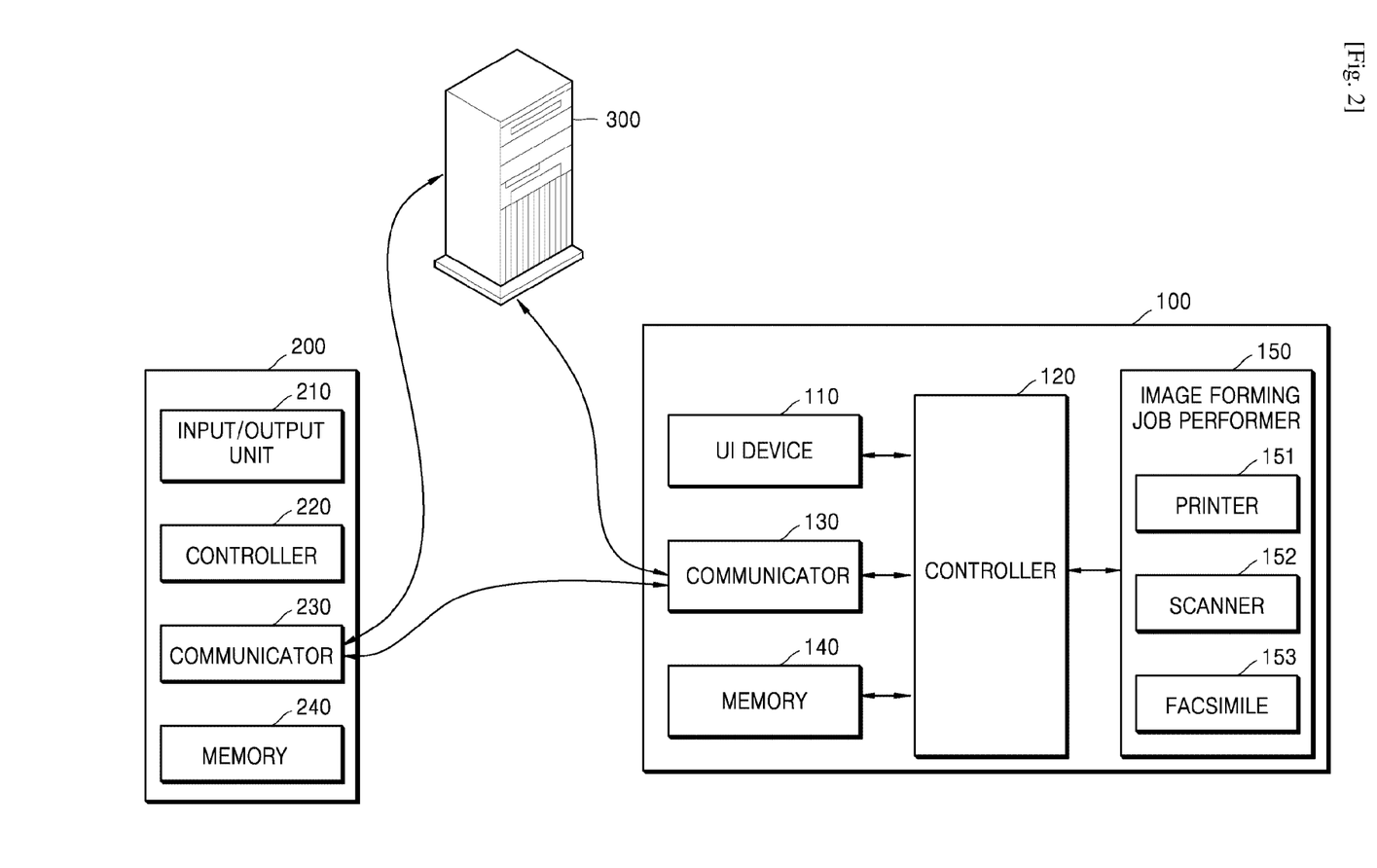
FIG. 2 is a diagram illustrating a state in which an image forming apparatus is connected to a user terminal or a server according to an example.

FIG. 1 is a block diagram illustrating a configuration of an image forming apparatus according to an example. FIG. 2 is a diagram illustrating a state in which an image forming apparatus is connected to a user terminal or a server according to an example.

Referring to FIG. 1, an image forming apparatus 100 may include a user interface (UI) device 110, a controller 120, a communicator 130, a memory 140, and an image forming job performer 150. Also, although not shown in FIG. 1, the image forming apparatus 100 may further include a power supplier for supplying power to each element.

The UI device 110 may include an input unit for receiving any of various inputs, such as an input that performs an image forming job from a user, and an output unit for displaying information, such as a result of the image forming job or a state of the image forming apparatus 100. For example, the UI device 110 may include an operation panel for receiving a user input and a display panel for displaying a screen.

In more detail, the input unit may include at least one device for receiving various types of user inputs, such as a keyboard, a physical button, a touchscreen, a camera, a microphone, and the like. Also, the output unit may include, for example, a display panel, a speaker, and the like. However, the present disclosure is not limited thereto, and the UI device 110 may include a device that supports various inputs/outputs.

The controller 120 controls overall operations of the image forming apparatus 100, and may include at least one processor such as a central processing unit (CPU). The controller 120 may control other elements included in the image forming apparatus 100 to perform an operation corresponding to a user input received through the UI device 110. The controller 120 may include at least one processor specialized for each function, or may be a single integrated processor.

For example, the controller 120 may execute a program stored in the memory 140, may read data or a file stored in the memory 140, may store a new file in the memory 140, and the like.

The communicator 130 may perform wired or wireless communication with another device or a network. To this end, the communicator 130 may include a communication module that supports at least one of various wired/wireless communication methods. For example, the communication module may be a chipset, or may be a sticker or a barcode (e.g., a sticker including a near field communication (NFC) tag) including information required for communication.

The wireless communication may include at least one from among, for example, Wireless Fidelity (Wi-Fi), Wi-Fi Direct, Bluetooth, ultra wide band (UWB), NFC, and the like. The wired communication may include at least one from among, for example, universal serial bus (USB), High Definition Multimedia Interface (HDMI), and the like.

The communicator 130 may be connected to an external apparatus located outside the image forming apparatus 100 and may transmit/receive a signal or data to/from the external apparatus.

Referring to FIG. 2, the image forming apparatus 100 may be connected to a user terminal 200 through the communicator 130. The communicator 130 may transmit a signal or data received from the user terminal 200 to the controller 120, or may transmit a signal or data generated by the controller 120 to the user terminal 200. For example, when the communicator 130 receives a print command signal and print data from the user terminal 200, the controller 120 may output the received print data through a printer 151.

As shown in FIG. 2, the user terminal 200 may include an input/output unit 210, a controller 220, a communicator 230, and a memory 240. The controller 220 may control an image forming job by executing a program stored in the memory 240 and by transmitting a signal or data generated as a result of the executed program to the image forming apparatus 100 through the communicator 230. Examples of the user terminal 200 may include, for example, a smartphone, a tablet PC, a home appliance, a medical device, a camera, a wearable device, and the like.

The communicator 130 may be directly connected to a server 300 and may transmit/receive a signal or data to/from the server 300. Also, the communicator 130 may be connected to the user terminal 200 through the server 300. That is, the communicator 130 of the image forming apparatus 100 may transmit/receive a signal or data to/from the communicator 230 of the user terminal 200 through the server 300.

Referring back to FIG. 1, a program such as an application and various types of data such as a file may be installed and stored in the memory 140. The controller 120 may access the data stored in the memory 140 and may use the data, or may store new data in the memory 140. Also, the controller 120 may execute the program installed in the memory 140 and may install an application received from an external source through the communicator 130 in the memory 140.

The image forming job performer 150 may perform an image forming job such as printing, copying, scanning, or faxing.

Although the image forming job performer 150 includes the printer 151, a scanner 152, and a facsimile 153 in FIG. 1, the image forming job performer 150 may include only some from among the printer 151, the scanner 152, and the facsimile 153, or may further include an element for performing another type of image forming job, if necessary.

The printer 151 may form an image on a recording medium by using any of various printing methods such as an electrophotography method, an inkjet method, a thermal transfer method, a thermal method, and the like.

The scanner 152 may emit light to a document, may receive reflected light, and may read an image recorded on the document. For example, a charge-coupled device (CCD) or a contact image sensor (CIS) may be used as an image sensor for reading an image from a document. The scanner 152 may have a flatbed structure in which a document is located at a fixed position and an image sensor moves to read an image, a document feed structure in which an image sensor is located at a fixed position and a document moves, or a combination structure thereof.

The facsimile 153 may share an element for scanning an image with the scanner 152, may share an element for printing a received file with the printer 151, and may transmit a scan file to a destination or receive a file from an external source.

The names of elements of the image forming apparatus 100 may be changed. Also, the image forming apparatus 100 according to the example may include at least one from among the above elements, may not include some elements, or may further include other additional elements.

The UI device 110 of FIG. 1 may include an independent control system. That is, separately from the controller 120 of the image forming apparatus 100, the UI device 110 may include a control system (e.g., a controller, a memory, etc.) for controlling a UI provided by the UI device 110. An operating system (OS) for providing a UI and programs such as an application for supporting various functions may be installed in the control system of the UI device 110.

Figure 3:
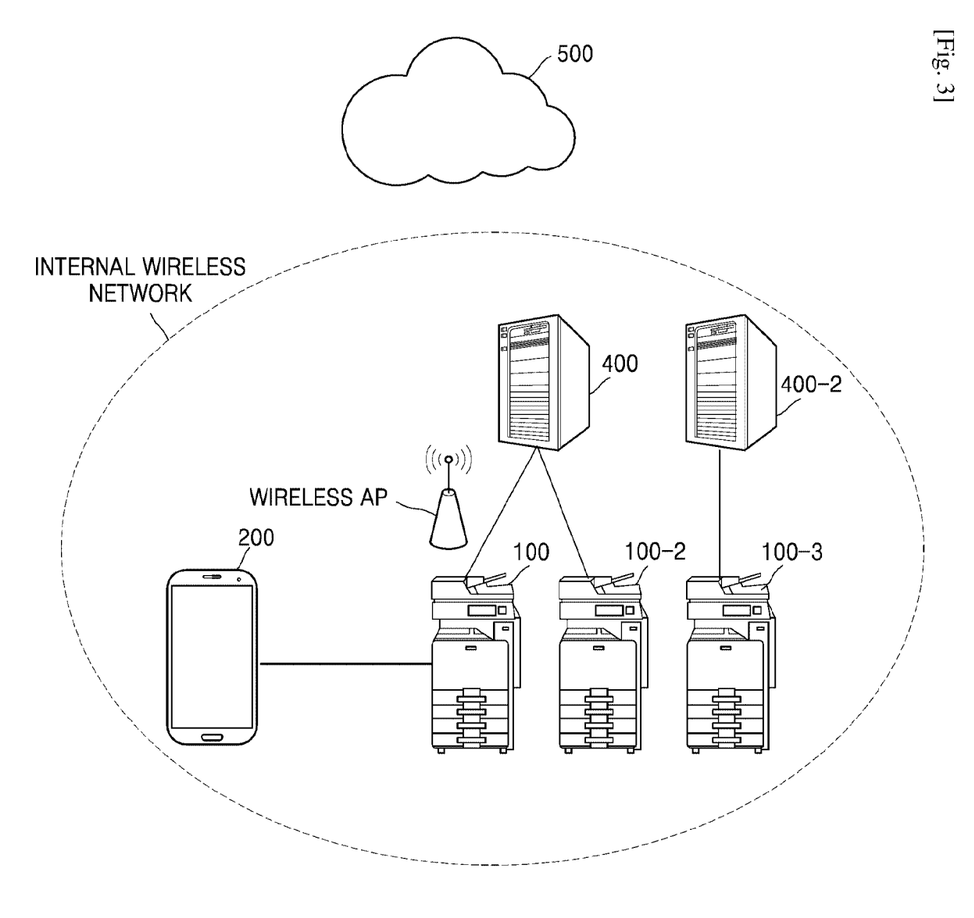
FIG. 3 is a diagram for explaining a pull printing system using a cloud server and a pull printing environment according to an example.

FIG. 3 is a diagram for explaining a pull printing system using a cloud server and a pull printing environment according to an example.

Referring to FIG. 3, a pull printing environment including image forming apparatuses 100, 100-2, and 100-3, the user terminal 200, print servers 400 and 400-2, and a cloud server 500 is illustrated. The pull printing environment may include one or more image forming apparatuses 100, one or more user terminals 200, and one or more print servers 400, and the one or more user terminals 200 and the one or more print servers 400 may be connected to the cloud server 500. For convenience of explanation, the following will focus on the image forming apparatus 100, the user terminal 200, the print server 400, and the cloud server 500. The cloud server 500 may include at least one processor (not shown), a storage (not shown), and a communication interface (not shown). The print server 400 may also include at least one processor (not shown), a storage (not shown), and a communication interface (not shown).

Although the user terminal 200 may be connected to the print server 400 through a wireless access point (AP), the user terminal 200 may not be capable of using an internal wireless network using the wireless AP according to a network configuration or a communication policy. When the user terminal 200 is not capable of being connected to the print server 400 by using the internal wireless network, the user terminal 200 may be connected to the print server 400 through the cloud server 500 and may perform pull printing.

The print server 400 may register the image forming apparatuses 100 and 100-2 that support pull printing, and may manage device information of the image forming apparatuses 100 and 100-2. In order to perform pull printing, the print server 400 may send a registration request to register the device information of the image forming apparatuses 100 and 100-2 that are registered in the print server 400 to the cloud server 500.

The cloud server 500 may receive a registration request to register device information of the image forming apparatuses 100, 100-2, and 100-3 from the print servers 400 and 400-2.

In order to obtain the device information of the image forming apparatus 100, the user terminal 200 may access the image forming apparatus 100 and may obtain the device information, such as a media access control (MAC) address, of the image forming apparatus 100. For example, a user may install and execute an application that supports pull printing in the user terminal 200, may input user information, such as an ID and a password, of the user to be authenticated by the print server 400, and may obtain the device information such as the MAC address by performing NFC tagging on the image forming apparatus 100, scanning a QR code on the image forming apparatus 100, accessing the image forming apparatus 100 through Bluetooth Low Energy (BLE), or the like. Alternatively, the user may directly input the device information of the image forming apparatus 100 to the application executed in the user terminal 200. Once the device information of the image forming apparatus 100 is input to the user terminal 200, as the application that supports pull printing is executed, the user terminal 200 may transmit a login request including the user information along with the device information of the image forming apparatus 100 to the cloud server 500.

The cloud server 500 may receive the login request including the user information and the device information of the image forming apparatus 100 from the user terminal 200.

The cloud server 500 may transmit the login request received from the user terminal 200 to the print server 400 corresponding to the device information of the image forming apparatus 100. The print server 400 may perform authentication in response to the login request transmitted from the cloud server 500.

The cloud server 500 may receive a job list as an authentication result according to the login request from the print server 400 corresponding to the device information of the image forming apparatus 100.

The cloud server 500 may transmit the job list received from the print server 400 corresponding to the device information of the image forming apparatus 100 to the user terminal 200.

The cloud server 500 may receive a request for a selected job in the job list from the user terminal 200, and may transmit the request for the selected job received from the user terminal 200 to the print server 400 corresponding to the device information of the image forming apparatus 100. The print server 400 may check an Internet protocol (IP) address of the image forming apparatus 100 by using the device information such as the MAC address, and may allow pull printing to be performed by transmitting the job selected by the user to the image forming apparatus 100 selected by the user.

Figure 4:
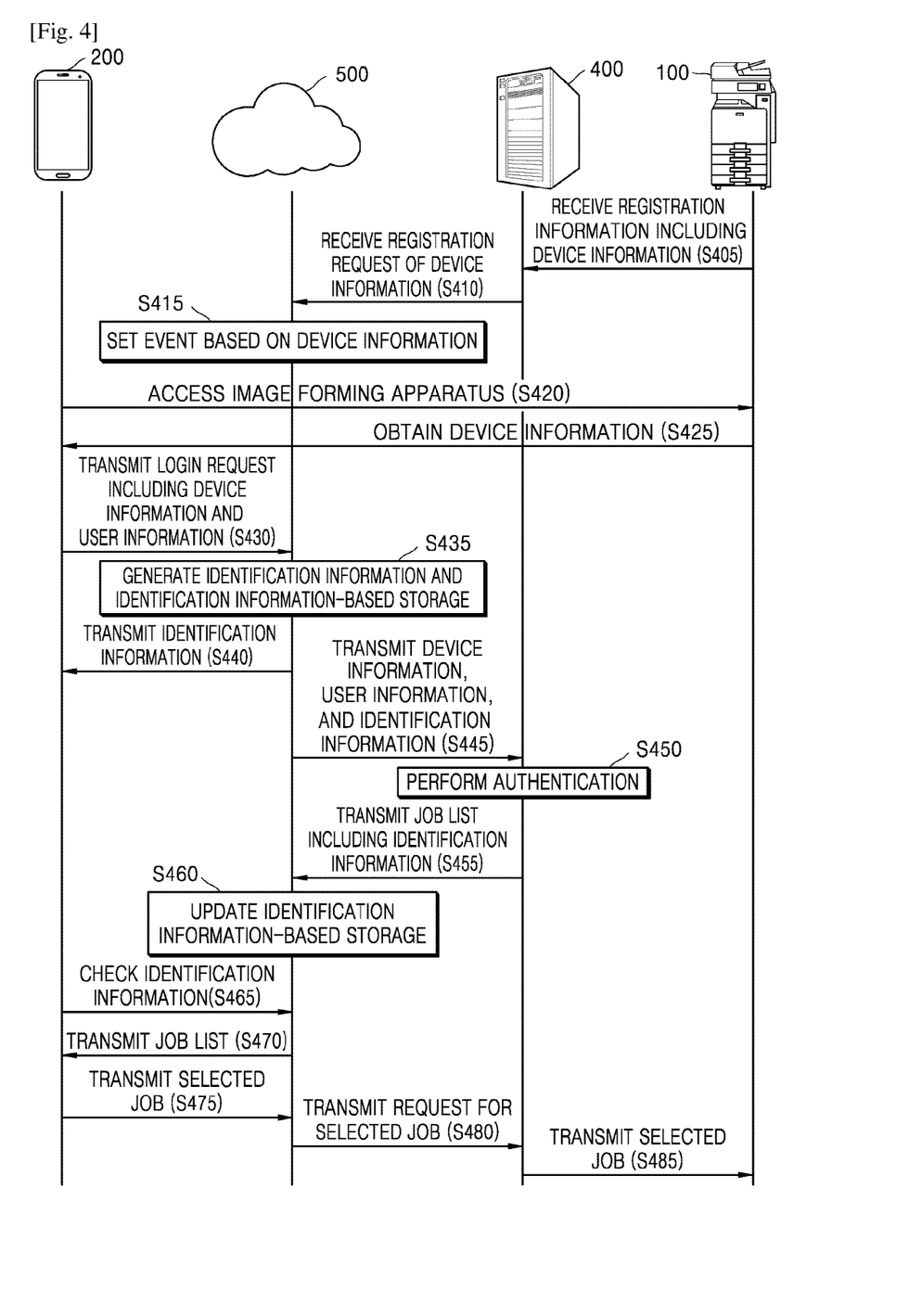
FIG. 4 is a diagram for explaining an operation of a pull printing system using a cloud server according to an example.

FIG. 4 is a diagram for explaining an operation of a pull printing system using a cloud server according to an example.

Referring to FIG. 4, the print server 400 may receive registration information including device information from the image forming apparatus 100 that supports pull printing, and may register the image forming apparatus 100 in operation S405.

In operation S410, the cloud server 500 may receive a registration request to register the device information of the image forming apparatus 100 from the print server 400.

In operation S415, the cloud server 500 may set an event based on the device information of the image forming apparatus 100. Since the cloud server 500 sets the event based on the device information of the image forming apparatus 100, although a plurality of the print servers 400 are connected to the cloud server 500, each print server 400 may receive an event based on the image forming apparatus 100 that is managed by itself from the cloud server 500. For example, since the cloud server 500 causes a topic of a message queuing telemetry transport (MQTT) protocol to be registered based on device information such as a MAC address, although the plurality of print servers 400 exist, each print server 400 may receive only an event based on the image forming apparatus 100 that is managed by itself from the cloud server 500, an example of which will now be described with reference to FIG. 5.

Figure 5:
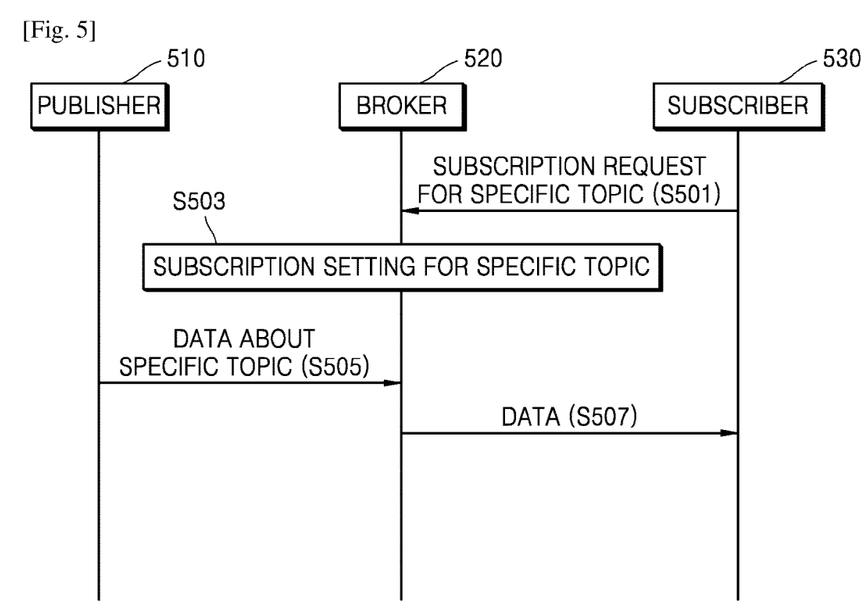
FIG. 5 is a diagram for explaining a state in which a cloud server sets an event based on device information in a pull printing system using the cloud server according to an example.

FIG. 5 is a diagram for explaining a state in which a cloud server sets an event based on device information in a pull printing system using the cloud server according to an example.

Referring to FIG. 5, an operation among a publisher 510, a broker 520, and a subscriber 530 is illustrated. The subscriber 530 may send a subscription request for a specific topic to the broker 520 in operation S501. The broker 520 may create a subscription setting for the specific topic requested by the subscriber 530 in operation S503. When the publisher 510 transmits data about the specific topic to the broker 520 in operation S505, the broker 520 may check that there is the subscription setting for the specific topic and may transmit the data to the subscriber 530 that sends the subscription request for the specific topic in operation S507.

When the description of FIG. 5 is applied to the operation among the user terminal 200, the cloud server 500, and the print server 400 of FIG. 4, the user terminal 200 may perform a function of the publisher 510, the cloud server 500 may perform a function of the broker 520, and the print server 400 may perform a function of the subscriber 530. The print server 400 may send a registration request to register the device information to the cloud server 500 by transmitting the device information of the image forming apparatus 100 that is managed by the print server 400 to the cloud server 500, and when an event related to the device information requested by the print server 400 is published, the cloud server 500 may set the event based on the device information so that the event is transmitted to the print server 400. When a request including the device information of the image forming apparatus 100 transmitted to the cloud server 500 from the user terminal 200 corresponds to the event based on the device information set by the cloud server 500, the cloud server 500 may transmit the request including the device information to the print server 400.

Referring back to FIG. 4, in operation S420, the user terminal 200 may access the image forming apparatus 100. As an example, the user terminal 200 may perform NFC tagging on the image forming apparatus 100, may scan a QR code on the image forming apparatus 100, and may access the image forming apparatus 100 through BLE.

In operation S425, the user terminal 200 may obtain the device information of the image forming apparatus 100. The device information may include a MAC address.

In operation S430, the user terminal 200 may transmit a login request including user information and the device information of the image forming apparatus 100 to the cloud server 500.

In operation S435, the cloud server 500 may generate identification information shared between the user terminal 200 and the print server 400 and an area corresponding to the identification in an identification information-based storage, in response to the received login request including the user information and the device information of the image forming apparatus 100.

In operation S440, it takes a predetermined time for the cloud server 500 receiving the login request of the user terminal 200 to transmit the login request to the print server 400, receive a result, and transmit a reply to the user terminal 200. Accordingly, in order for the user terminal 200 to know that the cloud server 500 has normally received the login request, the cloud server 500 may transmit the identification information shared between the user terminal 200 and the print server 400 to the user terminal 200. Also, the cloud server 500 may initialize the area corresponding to the identification information generated in the identification information-based storage.

In operation S445, the cloud server 500 may transmit the login request further including the identification information to the print server 400 corresponding to the device information of the image forming apparatus 100. For example, the cloud server 500 may generate an MQTT message and may cause the print server 400 to receive the MQTT message. In this case, the MQTT message may include the login request along with the device information, the user information, and the identification information.

In operation S450, the print server 400 may receive the login request including the device information, the user information, and the identification information, and may perform authentication by using the user information.

In operation S455, when the authentication ends, the print server 400 may transmit a job list further including the identification information as an authentication result to the cloud server 500.

In operation S460, the cloud server 500 may receive the job list further including the identification information from the print server 400 corresponding to the device information of the image forming apparatus 100, and may update the area corresponding to the identification information in the identification information-based storage based on the identification information and the job list.

Figure 6:
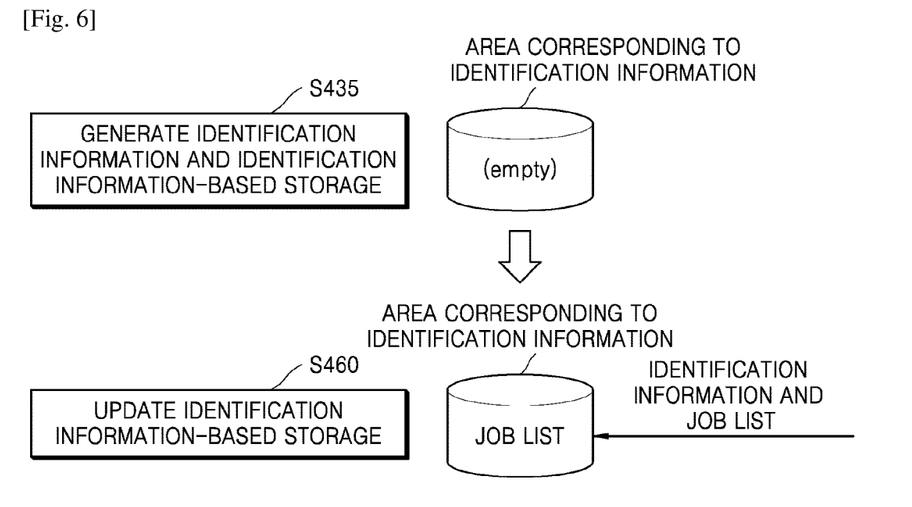
FIG. 6 is a diagram for explaining a state in which a cloud server manages an identification information-based storage in a pull printing system using the cloud server according to an example.

FIG. 6 is a diagram for explaining a state in which a cloud server manages an identification information-based storage in a pull printing system using the cloud server according to an example.

As described with reference to operations S435 through S465 of FIG. 4, the identification information-based storage may be generated by the cloud server 500. In more detail, after the cloud server 500 generates the identification information, the cloud server 500 may manage the area corresponding to the identification information by using the identification information generated in the identification information-based storage. The area corresponding to the identification information may have an initial value according to initialization. When the job list including the identification information is received from the print server 400 by the cloud server 500, the cloud server 500 may update the area corresponding to the identification information based on the received job list and the received identification information. The area corresponding to the identification information in the identification information-based storage may be a temporary repository of the cloud server 500 having an expiration time.

Referring again to FIG. 4, the user terminal 200 may check whether the area corresponding to the identification information in the identification information-based storage is changed by using the identification information received from the cloud server 500 in operation S465. The user terminal 200 may periodically check whether the area corresponding to the identification information in the identification information-based storage is changed by using the identification information. The area corresponding to the identification information may be maintained at the initial value according to initialization until the cloud server 500 receives the job list from the print server 400, and the area corresponding to the identification information may be updated and the job list that allows pull printing may be checked after the cloud server 500 receives the job list.

In operation S470, the cloud server 500 may transmit the job list based on which the area corresponding to the identification information is updated to the user terminal 200, in response to the identification information received from the user terminal 200.

In operation S475, the user terminal 200 may display the received job list, and may transmit a job selected by a user to the cloud server 500.

In operation S480, the cloud server 500 may receive a request for the selected job in the job list from the user terminal 200, and may transmit the request for the selected job to the print server 400 corresponding to the device information of the image forming apparatus 100.

In operation S485, the print server 400 may transmit the selected job to the image forming apparatus 100 corresponding to the device information so that the selected job is performed by the image forming apparatus 100.

Figure 7:
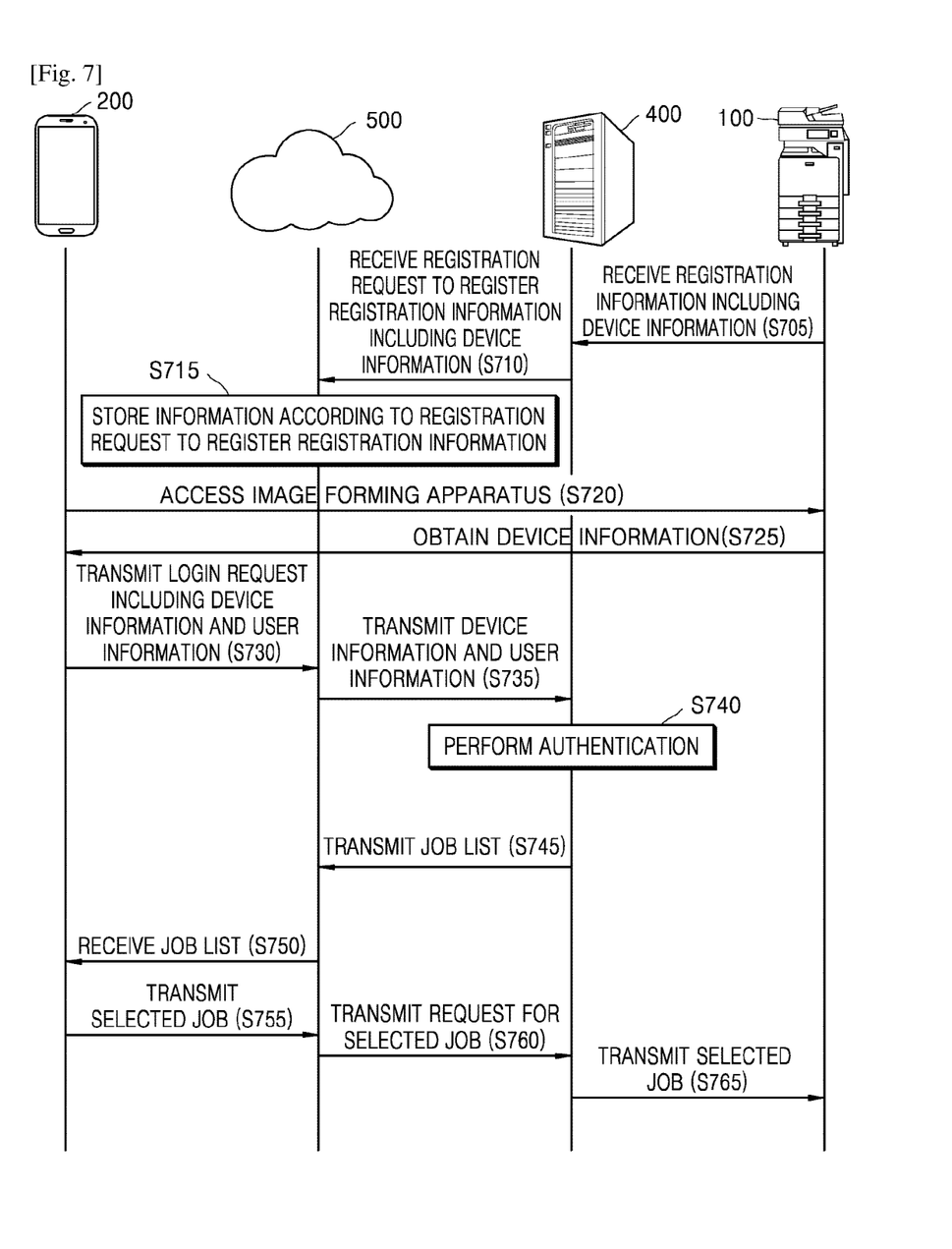
FIG. 7 is a diagram for explaining an operation of a pull printing system using a cloud server according to another example.

FIG. 7 is a diagram for explaining an operation of a pull printing system using a cloud server according to another example.

Unlike FIG. 4, FIG. 7 is a diagram for explaining a method by which information of the print server 400 and device information of the image forming apparatus 100 that is managed by the print server 400 are registered and stored in the cloud server 500, without using an MQTT protocol, and the print server 400 is connected to the cloud server 500 through long polling and receives a login request or a request for a selected job from the cloud server 500 and sends a reply. The description that is the same as or similar to that made with reference to FIG. 4 will not be given.

In operation S705, the print server 400 may receive registration information including device information from the image forming apparatus 100 that supports pull printing, and may register the image forming apparatus 100.

In operation S710, the cloud server 500 may receive a registration request for the registration information including the device information of the image forming apparatus 100 from the print server 400.

In operation S715, the cloud server 500 may store information of the print server 400 and the device information of at least one image forming apparatus 100, according to the registration request to register the registration information including the device information of the at least one image forming apparatus 100. Accordingly, the cloud server 500 may relay the user terminal 200 and the print server 400 by using registration information that is the same as the registration information registered in the print server 400, and may support pull printing.

In operation S720, the user terminal 200 may access the image forming apparatus 100.

In operation S725, the user terminal 200 may obtain the device information of the image forming apparatus 100.

In operation S730, the user terminal 200 may transmit a login request including user information and the device information of the image forming apparatus 100 to the cloud server 500.

In operation S735, the cloud server 500 may transmit the login request to the print server 400 corresponding to the device information of the image forming apparatus 100.

In operation S740, the print server 400 may receive the login request including the user information and the device information, and may perform authentication by using the user information.

In operation S745, when the authentication ends, the print server 400 may transmit a job list as an authentication result to the cloud server 500.

In operation S750, the cloud server 500 may receive the job list from the print server 400, and may transmit the received job list to the user terminal 200.

In operation S755, the user terminal 200 may display the received job list, and may transmit a job selected by a user to the cloud server 500.

In operation S760, the cloud server 500 may receive a request for the selected job in the job list from the user terminal 200, and may transmit the request for the selected job to the print server 400 corresponding to the device information of the image forming apparatus 100.

In operation S765, the print server 400 may transmit the selected job to the image forming apparatus 100 corresponding to the device information so that the selected job is performed by the image forming apparatus 100.

Figure 8:
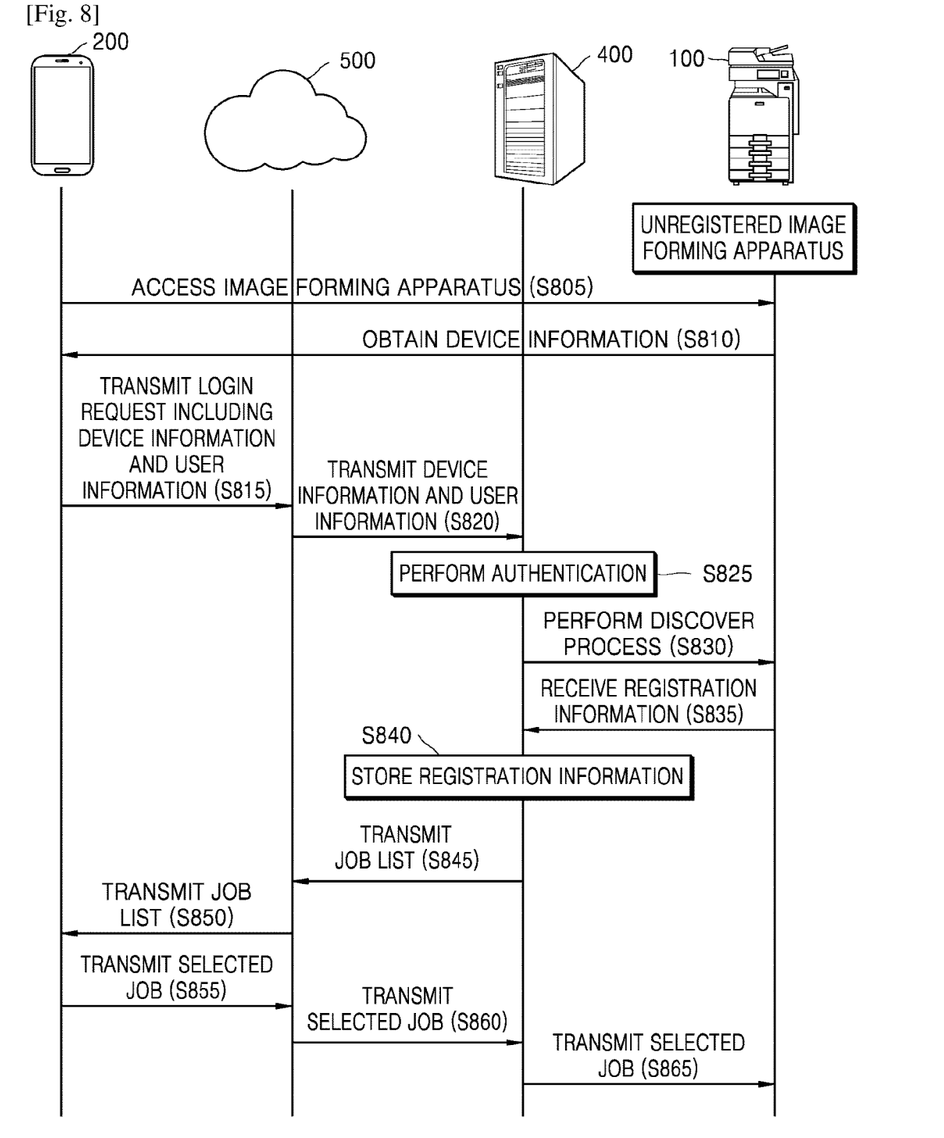
FIGS. 8 through 10 are diagrams each illustrating a response policy when there is a pull printing request for an unregistered image forming apparatus in a pull printing system using a cloud server according to various examples.
Figure 9:
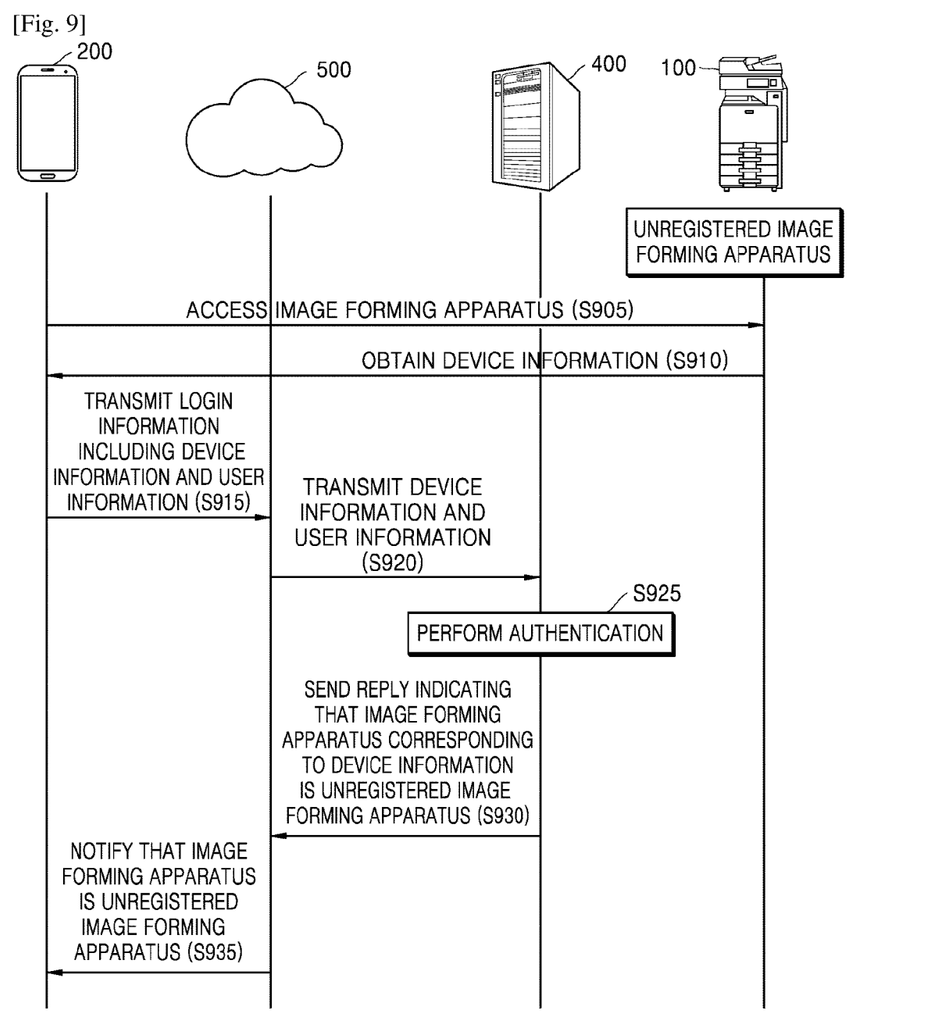
Figure 10:
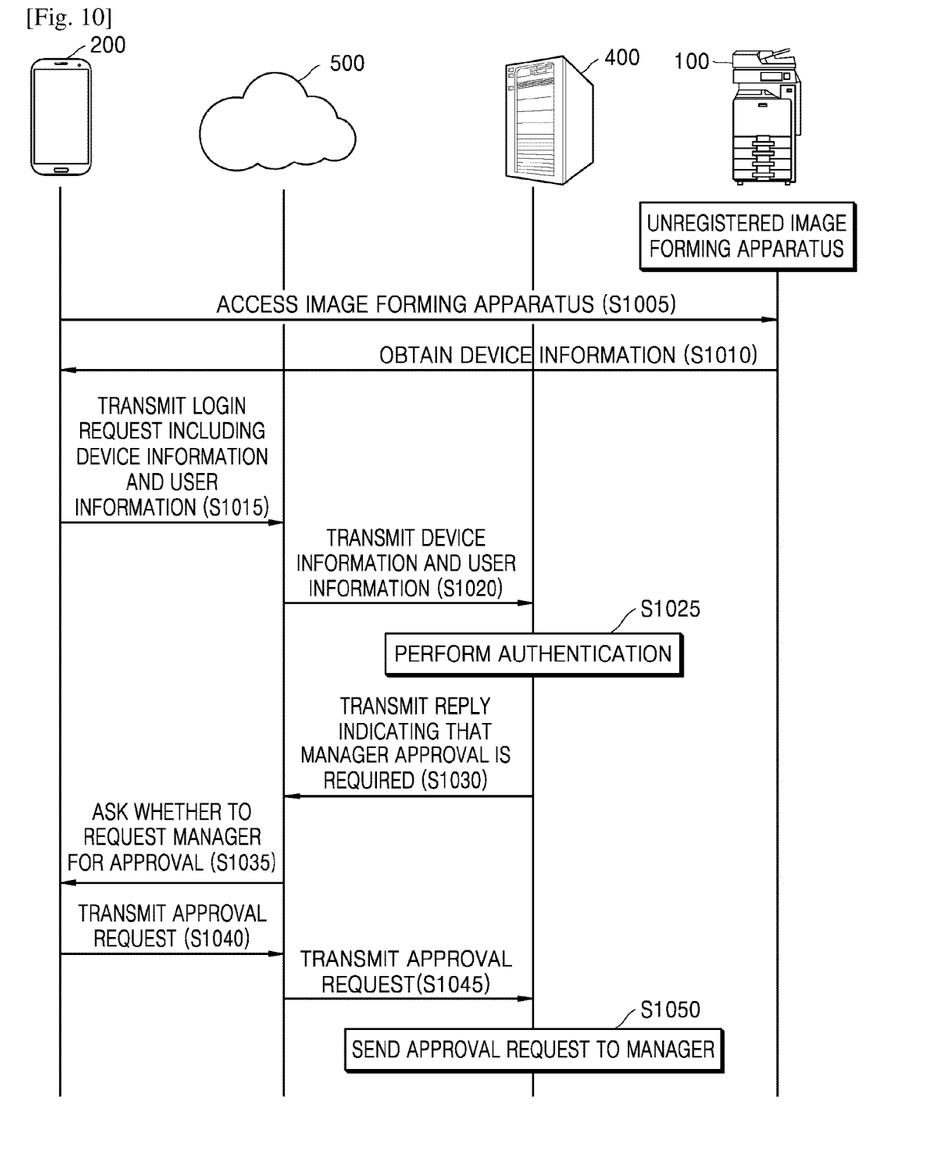

FIGS. 8 through 10 are diagrams each illustrating a response policy when there is a pull printing request for an unregistered image forming apparatus in a pull printing system using a cloud server according to various examples.

When a login request transmitted from the user terminal 200 by the cloud server 500 is a login request for the unregistered image forming apparatus 100, the cloud server 500 may receive any one from among a registration request to register device information of the unregistered image forming apparatus 100, a reply indicating that the image forming apparatus 100 is the unregistered image forming apparatus 100, a reply indicating that manager approval is required, and the like, as an authentication result according to the login request, from the print server 400 corresponding to the device information of the image forming apparatus 100.

FIG. 8 illustrates an example in which a print server 400 may discover the unregistered image forming apparatus 100 and may transmit a job, registration information including device information is automatically registered in the print server, 400 and a registration request to register the device information of the unregistered image forming apparatus 100 is sent to the cloud server 500.

Referring to FIG. 8, the user terminal 200 may access the image forming apparatus 100 in operation S805.

In operation S810, the user terminal 200 may obtain device information of the image forming apparatus 100.

In operation S815, the user terminal 200 may transmit a login request including user information and the device information of the image forming apparatus 100 to the cloud server 500.

In operation S820, the cloud server 500 may transmit the login request to the print server 400 corresponding to the device information of the image forming apparatus 100.

In operation S825, the print server 400 may receive the login request including the user information and the device information, and may perform authentication by using the user information.

In operation S830, when it is determined as an authentication result that the image forming apparatus 100 for which a login is requested by a user is the unregistered image forming apparatus 100, the print server 400 checks whether the print server 400 may transmit a print job to the unregistered image forming apparatus 100 through a discovery process.

When it is determined that the print server 400 may transmit the print job to the unregistered image forming apparatus 100, the print server 400 may receive registration information including the device information from the unregistered image forming apparatus 100 in operation S835.

In operation S840, the print server 400 may store the registration information received from the unregistered image forming apparatus 100, and may register the unregistered image forming apparatus 100.

In operation S845, the print server 400 may transmit a job list to the cloud server 500.

In operation S850, the cloud server 500 may receive the job list from the print server 400, and may transmit the received job list to the user terminal 200.

In operation S855, the user terminal 200 may display the received job list, and may transmit a job selected by the user to the cloud server 500.

In operation S860, the cloud server 500 may receive a request for the selected job in the job list from the user terminal 200, and may transmit the request for the selected job to the print server 400 corresponding to the device information of the image forming apparatus 100.

In operation S865, the print server 400 may transmit the selected job to the image forming apparatus 100 corresponding to the device information so that the selected job is performed by the image forming apparatus 100.

FIG. 9 illustrates an example in which, in order not to use the unregistered image forming apparatus 100, the print server 400 transmits a reply indicating that the image forming apparatus 100 is the unregistered image forming apparatus 100 to the cloud server 500 and the cloud server 500 notifies the user terminal 200 that the image forming apparatus 100 is the unregistered image forming apparatus 100.

Referring to FIG. 9, the user terminal 200 may access the image forming apparatus 100 in operation S905.

In operation S910, the user terminal 200 may obtain device information of the image forming apparatus 100.

In operation S915, the user terminal 200 may transmit a login request including user information and the device information of the image forming apparatus 100 to the cloud server 500.

In operation S920, the cloud server 500 may transmit the login request to the print server 400 corresponding to the device information of the image forming apparatus 100.

In operation S925, the print server 400 may receive the login request including the user information and the device information, and may perform authentication by using the user information.

In operation S930, when it is determined as an authentication result that the image forming apparatus 100 for which a login is requested by a user is the unregistered image forming apparatus 100, the print server 400 sends a reply indicating that the image forming apparatus 100 corresponding to the device information is the unregistered image forming apparatus 100 to the cloud server 500.

In operation S935, the cloud server 500 may notify the user terminal 200 that the image forming apparatus 100 corresponding to the device information is the unregistered image forming apparatus 100.

FIG. 10 illustrates an example in which the print server 400 transmits, to the cloud server 500, a reply indicating that manager approval is required since the image forming apparatus 100 is the unregistered image forming apparatus 100, the cloud server 500 asks the user terminal 200 whether to request a manager for approval, and the print server 400 sends an approval request message to the manager.

Referring to FIG. 10, the user terminal 200 may access the image forming apparatus 100 in operation S1005.

In operation S1010, the user terminal 200 may obtain device information of the image forming apparatus 100.

In operation S1015, the user terminal 200 may transmit a login request including user information and the device information of the image forming apparatus 100 to the cloud server 500.

In operation S1020, the cloud server 500 may transmit the login request to the print server 400 corresponding to the device information of the image forming apparatus 100.

In operation S1025, the print server 400 may receive the login request including the user information and the device information, and may perform authentication by using the user information.

In operation S1030, when it is determined as an authentication result that the image forming apparatus 100 for which a login is requested by a user is the unregistered image forming apparatus 100, the print server 400 transmits, to the cloud server 500, a reply indicating that the image forming apparatus 100 corresponding to the device information needs manager approval.

In operation S1035, the cloud server 500 may ask the user terminal 200 whether to request a manager for approval of the image forming apparatus 100 corresponding to the device information for which a login is requested.

In operation S1040, the user terminal 200 may receive an approval request from the user, and may transmit the approval request to the cloud server 500.

In operation S1045, the cloud server 500 may transmit the approval request to the print server 400.

In operation S1050, the print server 400 may send the approval request to the manager, and may wait for the manager's approval.

Figure 11:
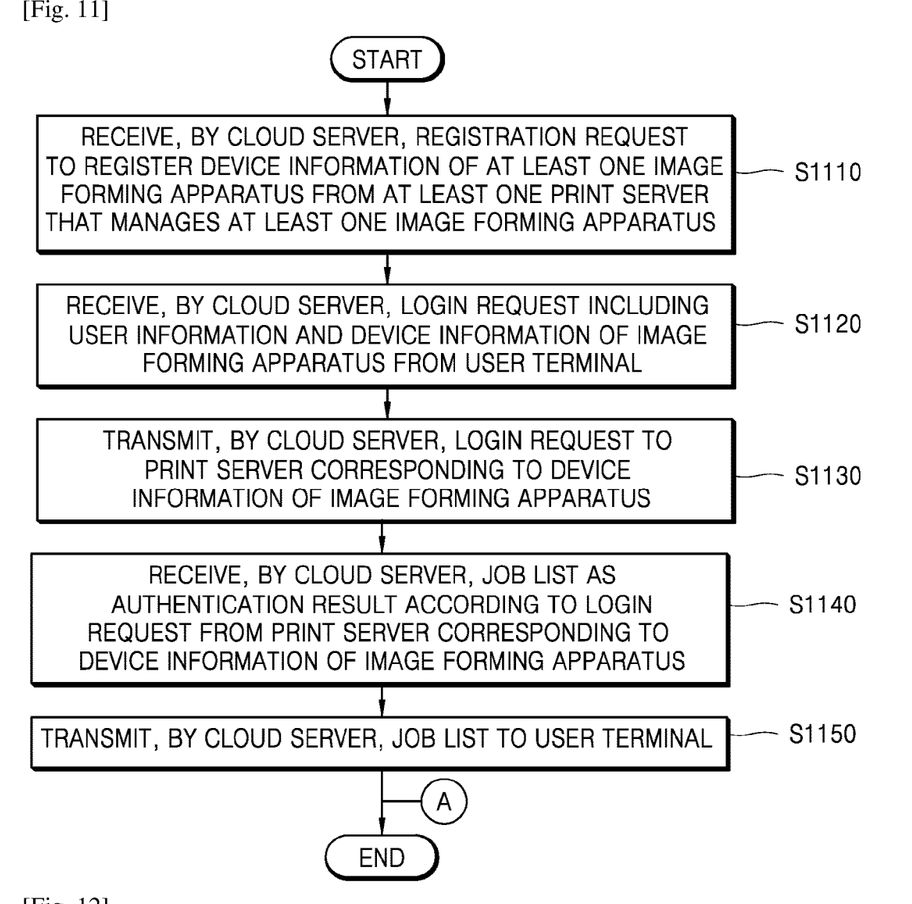
FIG. 11 is a flowchart of a pull printing method using a cloud server according to an example.

FIG. 11 is a flowchart of a pull printing method using a cloud server according to an example.

Referring to FIG. 11, the cloud server 500 receives a registration request to register device information of at least one image forming apparatus 100 from at least one print server 400 that manages the at least one image forming apparatus 100 in operation S1110. As an example, the cloud server 500 may set an event based on the device information of the at least one image forming apparatus 100. Alternatively, in operation S1110 the cloud server 500 may store the device information of the at least one image forming apparatus 100 and information of the print server 400.

In operation S1120, the cloud server 500 receives a login request including user information and the device information of the image forming apparatus 100 from the user terminal 200. According to an example, the cloud server 500 may generate identification information shared between the user terminal 200 and the print server 400 and an area corresponding to the identification information in an identification information-based storage, in response to the received login request.

In operation S1130, the cloud server 500 transmits the login request to the print server 400 corresponding to the device information of the image forming apparatus 100. According to an example, the cloud server 500 may transmit the login request further including the identification information.

In operation S1140, the cloud server 500 receives a job list as an authentication result according to the login request from the print server 400 corresponding to the device information of the image forming apparatus 100. According to an example, the cloud server 500 may receive the job list further including the identification information, and may update the area corresponding to the identification information in the identification information-based storage based on the identification information and the job list.

In operation S1150, the cloud server 500 transmits the job list to the user terminal 200. According to an example, the cloud server 500 may transmit the job list based on which the area corresponding to the identification information is updated to the user terminal 200, in response to the identification information received from the user terminal 200.

Figure 12:
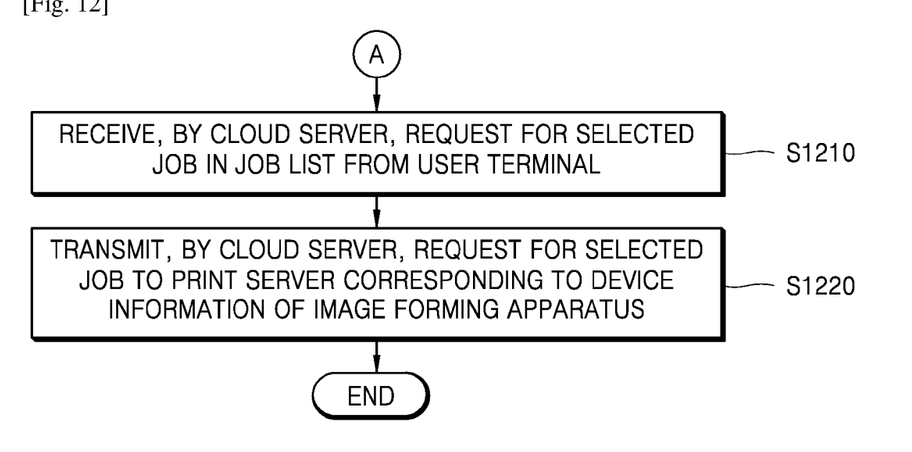
FIG. 12 is a flowchart for explaining a process of pull printing a selected job in a job list in a pull printing method using a cloud server according to an example.

FIG. 12 is a flowchart for explaining a process of pull printing a selected job in a job list in a pull printing method using a cloud server according to an example.

Referring to FIG. 12, the cloud server 500 receives a request for a selected job in a job list from the user terminal 200 in operation S1210.

In operation S1220, the cloud server 500 transmits the request for the selected job to the print server 400 corresponding to device information of the image forming apparatus 100.

Examples may be implemented on a computer-readable recording medium storing instructions and data executable by a processor or a computer. At least one of the instructions and the data may be stored as program code, and when being executed, may cause a predetermined program module to be generated and a predetermined operation to be performed. Examples of the computer-readable recording medium include read-only memory (ROM), random-access memory (RAM), flash memory, CD-ROMs, CDRs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing instructions or software, any associated data, data files, and data structures and providing the instructions or software, any associated data, data files, and data structures to a processor or computer so that the processor or computer executes the instructions. For example, the computer-readable recording medium may be the memory 140 of the image forming apparatus 100 or a memory of the UI device 110.

While the present disclosure has been shown and described with reference to examples thereof by using specific terms, the examples have merely been used to explain the present disclosure and should not be construed as limiting the scope of the present disclosure as defined by the claims. The examples should be considered in a descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A cloud server comprising:
processor; and
communication interface,
wherein the communication interface is to:
receives a registration request to register device information of at least one image forming apparatus from at least one print server,
receive a login request comprising user information and device information of an image forming apparatus, from a user terminal,
transmit the login request to a print server corresponding to the device information of the image forming apparatus,
receive a job list as an authentication result according to the login request, from the print server corresponding to the device information of the image forming apparatus, and
transmits the job list to the user terminal,
wherein the communication interface is to receive the login request from the user terminal when the user terminal is not capable of being connected via an internal wireless network to the print server.

2. The cloud server of claim 1, wherein the processor is to set an event based on the device information of the at least one image forming apparatus, according to the registration request to register the device information of the at least one image forming apparatus.

3. The cloud server of claim 1,
wherein the processor is to:
generate identification information shared between the user terminal and the print server and an area corresponding to the identification information in an identification information-based storage, in response to the received login request, and
initialize the area corresponding to the identification information in the identification information-based storage, and
wherein the communication interface is to transmit the identification information to the user terminal.

4. The cloud server of claim 3, wherein the communication interface is to transmit the login request including the identification information to the print server corresponding to the device information of the image forming apparatus.

5. The cloud server of claim 4,
wherein the communication interface is to receive the job list including the identification information, from the print server corresponding to the device information of the image forming apparatus, and
wherein the processor is to update the area corresponding to the identification information in the identification information-based storage, based on the identification information and the job list.

6. The cloud server of claim 5, wherein the communication interface is to transmit, to the user terminal, the job list based on which the area corresponding to the identification information is updated, in response to the identification information received from the user terminal.

7. The cloud server of claim 1, wherein the processor is to store information of the print server and the device information of the at least one image forming apparatus, according to the registration request to register the device information of the at least one image forming apparatus.

8. The cloud server of claim 1, wherein, when the login request is a login request for an unregistered image forming apparatus, the communication interface is to receive a registration request to register device information of the unregistered image forming apparatus, a reply indicating that the image forming apparatus is the unregistered image forming apparatus, or a reply indicating that manager approval is required, as the authentication result according to the login request, from the print server corresponding to the device information of the image forming apparatus.

9. The cloud server of claim 1, wherein the communication interface is to receive a request for a selected job in the job list from the user terminal and transmits the request for the selected job to the print server corresponding to the device information of the image forming apparatus.

10. A pull printing method, the pull printing method comprising:
receiving, by a cloud server, a registration request to register device information of at least one image forming apparatus from at least one print server to manage the at least one image forming apparatus;
receiving, by the cloud server, a login request comprising user information and device information of an image forming apparatus from a user terminal;
transmitting, by the cloud server, the login request to a print server corresponding to the device information of the image forming apparatus;
receiving, by the cloud server, a job list as an authentication result according to the login request from the print server corresponding to the device information of the image forming apparatus; and
transmitting, by the cloud server, the job list to the user terminal,
wherein the receiving of the login request comprises receiving, by the cloud server, the login request from the user terminal when the user terminal is not capable of being connected via an internal wireless network to the print server.

11. The pull printing method of claim 10, wherein the receiving of the registration request to register the device information of the at least one image forming apparatus comprises setting an event based on the device information of the at least one image forming apparatus.

12. The pull printing method of claim 10, further comprising generating, by the cloud server, identification information shared between the user terminal and the print server and an area corresponding to the identification information in an identification information-based storage, in response to the received login request,
wherein the transmitting of the login request comprises transmitting the login request including the identification information.

13. The pull printing method of claim 12, wherein the receiving of the job list comprises:
receiving the job list including the identification information; and
updating the area corresponding to the identification information in the identification information-based storage, based on the identification information and the job list.

14. The pull printing method of claim 13, wherein the transmitting of the job list to the user terminal comprises transmitting, to the user terminal, the job list based on which the area corresponding to the identification information is updated, in response to the identification information received from the user terminal.

15. The pull printing method of claim 10, wherein the receiving of the registration request to register the device information of the at least one image forming apparatus comprises storing information of the print server and the device information of the at least one image forming apparatus.

16. The pull printing method of claim 10, further comprising, when the login request is a login request for an unregistered image forming apparatus, receiving, by the cloud server, a registration request to register device information of the unregistered image forming apparatus, a reply indicating that the image forming apparatus is the unregistered image forming apparatus, or a reply indicating that manager approval is required, as the authentication result according to the login request, from the print server corresponding to the device information of the image forming apparatus.

17. The pull printing method of claim 10, further comprising:
receiving, by the cloud server, a request for a selected job in the job list from the user terminal; and
transmitting, by the cloud server, the request for the selected job to the print server corresponding to the device information of the image forming apparatus.

18. A non-transitory computer-readable recording medium having embodied thereon instructions for implementing a pull printing method, the non-transitory computer readable recording medium comprising:
instructions to receive, by a cloud server, a registration request to register device information of at least one image forming apparatus from at least one print server configured to manage the at least one image forming apparatus;
instructions to receive, by the cloud server, a login request comprising user information and device information of an image forming apparatus from a user terminal;
instructions to transmit, by the cloud server, the login request to a print server corresponding to the device information of the image forming apparatus;
instructions to receive, by the cloud server, a job list as an authentication result according to the login request from the print server corresponding to the device information of the image forming apparatus; and
instructions to transmit, by the cloud server, the job list to the user terminal,
wherein the instructions to receive the login request comprise instructions to receive, by the cloud server, the login request from the user terminal when the user terminal is not capable of being connected via an internal wireless network to the print server.

* * * * *